May 3, 1949.　　　　S. ROSIN ET AL　　　　2,469,080
UNITARY LENS UNIT

Filed May 9, 1945　　　　　　　　　　　　　2 Sheets-Sheet 1

SEYMOUR ROSIN
GEORGE M. CRESSATY
INVENTORS

BY Ralph E. Bitner
ATTORNEY

May 3, 1949.  S. ROSIN ET AL  2,469,080
UNITARY LENS UNIT

Filed May 9, 1945  2 Sheets-Sheet 2

SEYMOUR ROSIN
GEORGE M. CRESSATY
INVENTORS

BY *Ralph E. Bitner*

ATTORNEY

Patented May 3, 1949

2,469,080

UNITED STATES PATENT OFFICE 2,469,080

UNITARY LENS UNIT

Seymour Rosin and George M. Cressaty, New York, N. Y.; said Rosin assignor to said Cressaty Application May 9, 1945, Serial No. 592,742

1 Claim. (Cl. 240—106.1)

This invention relates to lens units that may be used to focus a beam of light from a concentrated source. It more particularly relates to that type of lens unit which utilizes both reflection and refraction in order to produce a desired beam of light.

The focussing device generally used with beam flashlights consists of a parabolic reflector surrounding the lamp with a piece of plane glass in front of both to protect them from dirt. The shape of the reflector is generally a true paraboloid since it is the surface of revolution of a parabola about its axis. While such a focussing device is widely used, there are several disadvantages inherent to this type. First, there is a tendency of the reflector to tarnish after continued usage. Second, the reflecting surface even when new is not of the highest efficiency. And third, the reflector must be made of considerable diameter if it is to include a large percentage of the rays from the lamp.

Lenses that both reflect and refract are not new in the art and a U. S. patent to Harris, No. 2,254,961, and Harris and Bitner Patent No. 2,254,962 describe some forms and shapes that are useful for increasing the focussing efficiency of a lamp with a concentrated source.

The present invention has been designed to overcome all the objections to the well-known parabolic reflector and to present some improvements over the designs disclosed in the above mentioned patents.

The present invention resides in a unitary lens block having two principal modes of beam formation. A central lens mounted on the optical axis refracts light rays from the source and sends them out in a parallel beam of light. A marginal lens block receives the marginal rays and after transmittal through the block they are reflected by the surface which forms the outer boundary of the block. This surface, as will be hereinafter described, is not a paraboloid but is formed by the surface of revolution of a parabola about an axis parallel but not coincident with the parabolic axis.

One of the objects of the invention is to obtain a single unitary focussing device by which nearly all the light from a small light bulb may be concentrated into a parallel beam.

Another object of the invention is to secure a high reflection efficiency without the use of metallic reflecting surfaces.

Another object of the invention is to provide a lens block which has an efficient light gathering characteristic but which is appreciably smaller in diameter than a paraboloid metal reflector having the same light gathering scope.

Another object of the invention is to reduce the cost of manufacturing such lens systems by designing the component surfaces so that the article may be molded in a simple single cavity mold.

Another object of the invention is to obtain complete utilization of almost all the rays given off by a small lamp by constructing the lens system so that part of the rays are reflected into a parallel beam while the remainder are refracted into a similar and parallel beam.

Other objects and structural details of the invention will be apparent from the following description when read in connection with the accompanying drawings, wherein Fig. 1 is a cross sectional view of one form of the lens and shows the paths of a number of light rays from the focal point to a parallel beam.

Figure 1:
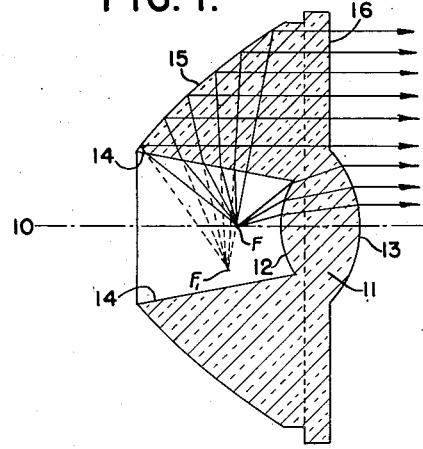
Figure 2:
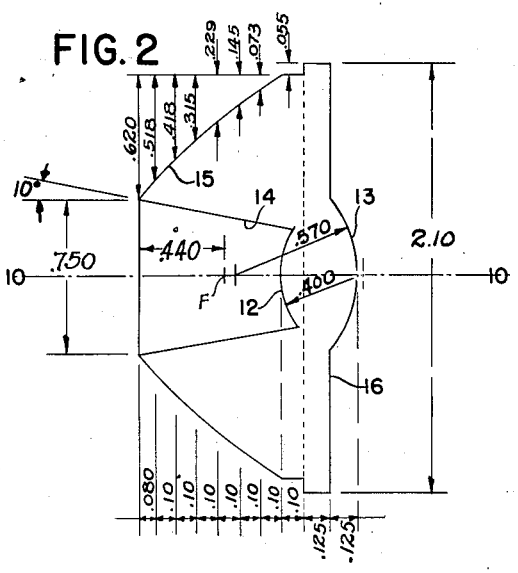
Fig. 2 is also a cross sectional view of the same lens but shows the structural dimensions of all surfaces.
Figure 3:
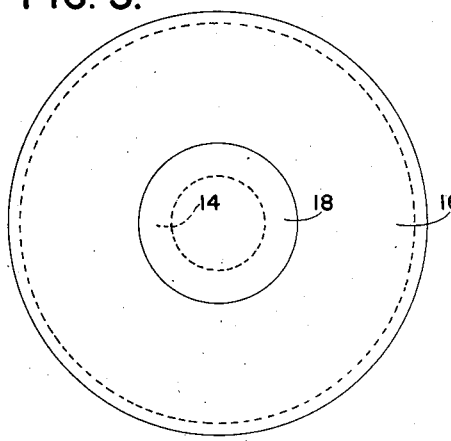
Fig. 3 is an elevational view of the lens shown in Fig. 2.

Referring now to Fig. 1, the point F on the optical axis 10—10 denotes the position of the light source. Axial rays move to the right and enter a bull's eye lens 11 through a spherical surface 12. After traversing the thickness of the lens, the rays emerge through surface 13 and travel parallel to the axis 10—10 in the usual manner. The curvatures and other characteristics of lens 11 are not important as long as the lens is positioned so that its focal point coincides with the source of light.

The marginal rays travel from the source F toward the sides of conical cavity 14 and as the rays enter the lens block they are refracted through a definite angle so that they continue on the inside of the block in a direction away from the point $F_1$. After traversing the block the rays strike surface 15 where they are totally reflected. A section of surface 15 as shown in Figs. 1, 2, 4, and 5 is part of a parabola which has its focal point at $F_1$ and its axis is a line drawn through $F_1$ and parallel to the line 10—10. However, to generate the surface 15, the parabola must be revolved about line 10—10 and not about its own axis. Therefore, surface 15 is not a parabola but is a higher order surface which has no definite name. After reflection the light rays travel in a parallel beam to the exit surface 16 where they emerge without change of direction.

In prior art descriptions of lenses having somewhat similar shapes, the true nature of the back reflecting surface was generally not understood nor correctly described. The sectional view, Fig. 1, consists of two equal parabolas, the foci of which are far from being coincident. If the parabolas are extended until they intersect, the point of intersection will be a "pole," or a point on a surface which has discontinuous first and second derivatives.

The displaced foci in section are in reality two points on a circle in space, which is traced out by rotation of the section about the axis of the lens. Such a circle may be termed correctly a "focal circle" of the surface. The only case in which the surface of a lens block is a paraboloid occurs when the light rays travel from the source into the lens block without change of direction. This case is of no practical value since it involves the formation of an internal spherical cavity, a molding technique that is impossible with present day equipment.

The phenomenon of total reflection is well known in the art and occurs when light rays within a refractive medium strike a boundary surface at an angle from the normal which is greater than the critical angle. The critical angle is a function of the refractive index of the refractive medium and is found by the following relation:

$$\sin A = \frac{1}{n}$$

where A is the angle between the light ray and the normal to the surface and $n$ is the refractive index.

In all the designs shown in the drawings, total reflection takes place at surface 15 because of the peculiar design. Forming the lamp cavity with an inclined boundary 14 contributes considerably to the requisite bending of the light rays so that they make the proper angle for total reflection.

Figure 8:
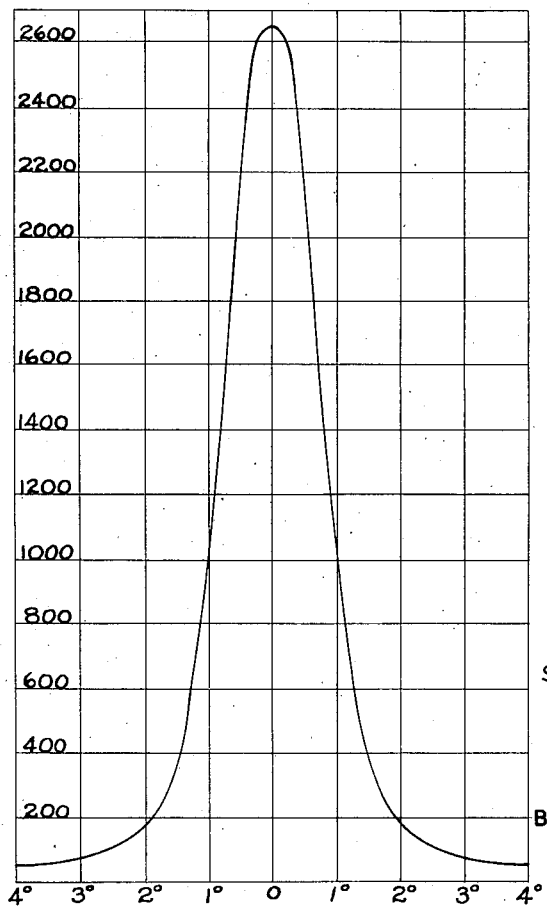
Fig. 8 is a graph showing the distribution of beam candlepower plotted against degrees away from the optical axis.

The beam of light formed by the unit shown in Fig. 1 is composed of parallel rays and is capable of creating an intense field of illumination when it strikes an object. The graph shown in Fig. 8 is the result of a carefully made series of tests by an independent testing laboratory and shows the variation of beam candlepower plotted against degrees measured on each side of the optical axis.

Figure 4:
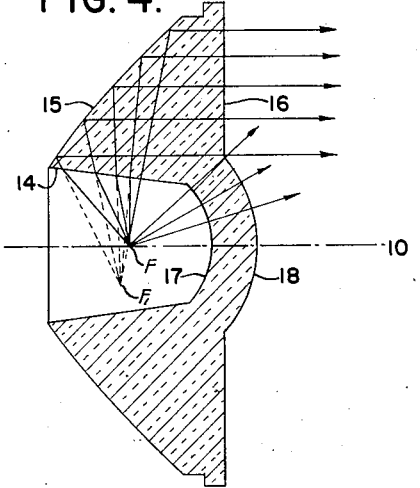
Fig. 4 is a cross sectional view of an alternate form of lens wherein the axial rays are not focused but are allowed to spread out to give general illumination.
Figure 5:
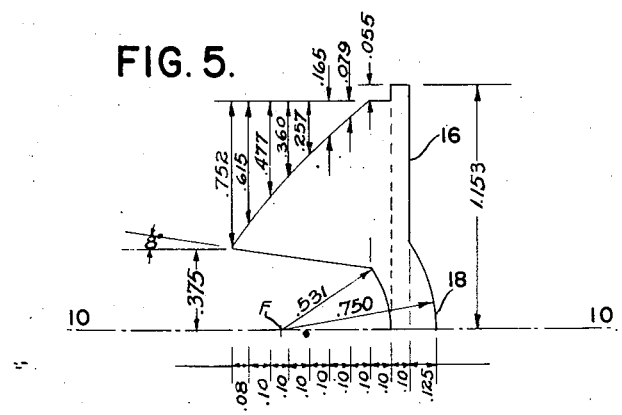
Fig. 5 is a cross sectional view of the same lens shown in Fig. 4 but shows the dimensional structure of all the surfaces.
Figure 6:
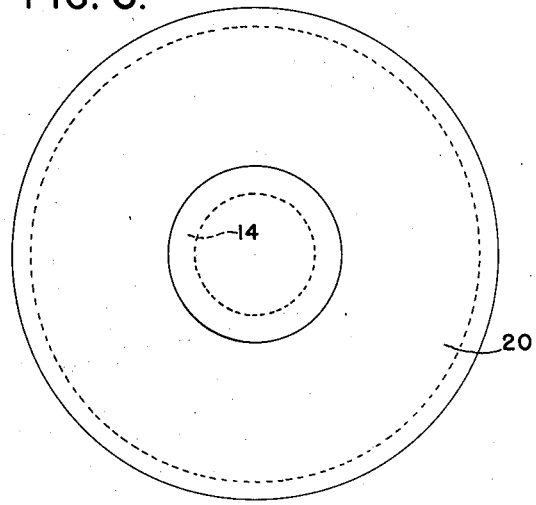
Fig. 6 is an elevational view of the lens shown in Fig. 4.

A single intense beam of light is not always desirable and the alternate form shown in Figs. 4, 5, and 6 is designed to provide a general weak field of illumination around the central beam. In this alternate form the marginal rays are treated in the same manner as in the first form and all the rays which strike the surface 15 are reflected into a parallel beam. The paraxial rays, however, first strike a curved surface 17 then traverse a small length of glass and emerge at surface 18 without any change in direction. Both spherical surfaces 17 and 18 have their centers at the point F where the source of light is placed and for this reason light rays originating at F will not be bent from their original path when traversing the glass wall.

Figure 7:
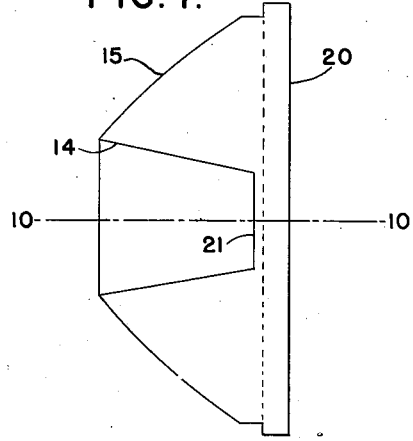
Fig. 7 is a cross sectional view of another alternate form of the invention similar to Fig. 4 but having a plane outside face.

Fig. 7 shows another variation which is easier to manufacture but does not have as much space for a lamp bulb. The optical characteristics are the same as the lens shown in Figs. 4, 5, and 6.

While a detailed portrayal has been given of some of the forms the invention may take, not only in its optical characteristics but also in its mechanical features, it is not intended to limit the invention to the above description. The invention may be used in connection with flashlights, spotlights, lanterns, and headlights. Either glass, transparent plastic, or any other transparent substance may be used for the lens unit. Various modifications may be made without departing from the spirit of the invention and the scope of the appended claim.

We claim:

A unitary lens unit comprising in combination, a central transparent window for transmitting paraxial rays without change of direction, a marginal lens block having a well to receive a source of light, a reflecting surface on the outer boundary of said block for reflecting marginal rays from the source of light into a parallel beam, said source of light positioned on the optical axis of said reflecting surface, said reflecting surface comprising a surface of revolution of a parabola about an axis parallel but not coincident with the parabolic axis.

SEYMOUR ROSIN.
GEORGE M. CRESSATY.

REFERENCES CITED

The following references are of record in the file of this patent:

UNITED STATES PATENTS

| Number | Name | Date |
| --- | --- | --- |
| 325,656 | Cloud | Sept. 8, 1885 |
| 1,281,752 | Bailey | Oct. 15, 1918 |
| 2,254,961 | Harris | Sept. 2, 1941 |
| 2,254,962 | Harris et al. | Sept. 2, 1941 |